United States Patent [19]

Chwalek et al.

[11] 4,244,748
[45] Jan. 13, 1981

[54] METHOD FOR SEPARATING MILL STARCH TO OBTAIN A PROTEIN-RICH PRODUCT AND A STARCH-RICH PRODUCT

[75] Inventors: Vincent P. Chwalek, Bolingbrook; Clifford W. Schwartz, Willowbrook, both of Ill.

[73] Assignee: CPC International Inc., Englewood Cliffs, N.J.

[21] Appl. No.: 5,537

[22] Filed: Jan. 22, 1979

Related U.S. Application Data

[62] Division of Ser. No. 734,683, Oct. 22, 1976, Pat. No. 4,144,087.

[51] Int. Cl.³ .................................................. C13L 1/00
[52] U.S. Cl. ............................................ 127/67; 127/69; 260/112 G
[58] Field of Search ........................... 127/67, 68, 69; 260/112 G

[56] References Cited

U.S. PATENT DOCUMENTS

| 2,310,651 | 2/1943 | Peltzer | 127/68 |
|---|---|---|---|
| 2,543,281 | 2/1951 | Ferrin | 127/69 |
| 2,550,341 | 4/1951 | Fontein | 209/211 |
| 2,556,322 | 6/1951 | Eckers | 127/69 |
| 2,642,185 | 6/1953 | Fontein | 209/211 |
| 2,689,810 | 9/1954 | Vegter | 127/69 |
| 2,773,784 | 12/1956 | Williams | 127/68 |
| 2,776,228 | 1/1957 | Snyder | 127/38 |
| 2,840,524 | 6/1958 | Stavenger | 210/21 |
| 3,029,168 | 4/1972 | Meisel | 127/67 |
| 3,029,169 | 4/1962 | Dowie | 127/67 |
| 3,072,501 | 1/1963 | Meisel | 127/67 |
| 3,251,717 | 5/1966 | Honeychurch | 127/68 |
| 3,474,722 | 10/1969 | Watson | 99/80 |
| 3,477,855 | 11/1969 | Freeman | 99/80 |
| 3,622,388 | 11/1971 | Larson | 127/23 |
| 3,901,725 | 8/1975 | Bond | 127/69 X |
| 4,125,528 | 11/1978 | Rao | 127/67 X |
| 4,132,566 | 1/1979 | Verberne | 127/67 X |
| 4,171,383 | 10/1979 | Chwalek | 127/68 X |

FOREIGN PATENT DOCUMENTS

| 148550 | 10/1952 | Australia . |
| 157512 | 7/1954 | Australia . |
| 928520 | 6/1955 | Fed. Rep. of Germany . |
| 1120588 | 7/1956 | France . |

OTHER PUBLICATIONS

Kurochitsky, C. K. et al., *Hydrocyclones in the Production of Starch and Molasses*, Moscow, Izdalel'stvo "Pishchevaya Promyshlenmost", 1964, pp. 46–48.

*Primary Examiner*—Sidney Marantz
*Attorney, Agent, or Firm*—Stanley M. Parmerter

[57] ABSTRACT

A system for separating the mill starch fraction in a corn wet milling operation into a protein enriched stream and a starch enriched stream to obtain therefrom a protein-rich product and a starch-rich product. The system utilizes only hydrocyclones arranged in a plurality of separation stages that are divided into two separation zones. The mill starch is fed sequentially through the two separation zones under controlled conditions so as to obtain a protein-rich product from one separation zone and a starch-rich product from the other separation zone.

15 Claims, 4 Drawing Figures

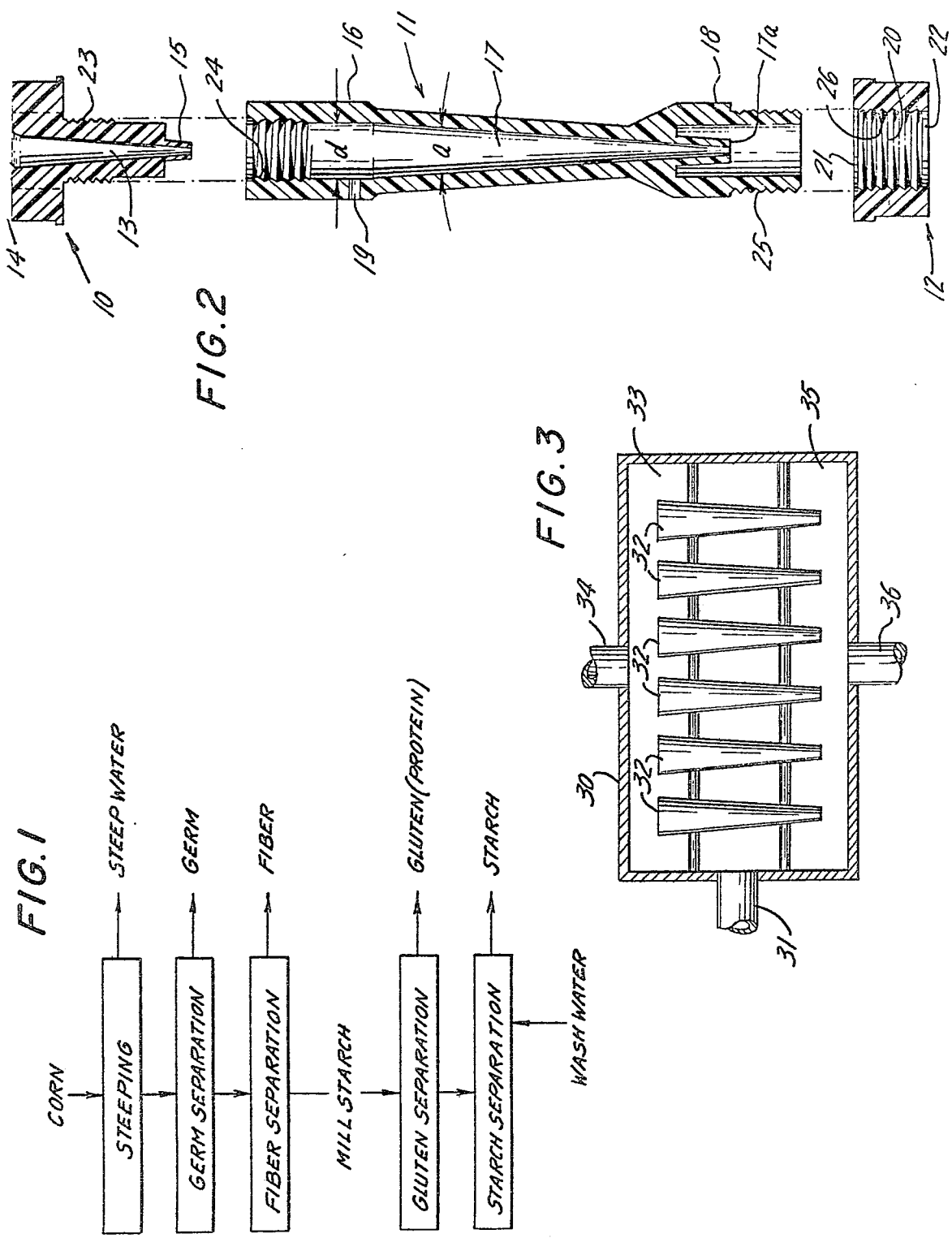

METHOD FOR SEPARATING MILL STARCH TO OBTAIN A PROTEIN-RICH PRODUCT AND A STARCH-RICH PRODUCT

This is a division of copending application Ser. No. 734,683 filed Oct. 22, 1976, now U.S. Pat. No. 4,144,087.

This invention relates to a system for separating the mill starch fraction of a corn wet milling process to obtain a protein-rich product and a starch-rich product.

BACKGROUND OF THE INVENTION

Various techniques and apparatus have been used in attempts to separate the mill starch fraction of a corn wet milling process into its major protein and starch components in such a way that recovery of these components would be both economical and of commercially acceptable quality.

The techniques and apparatus used have included first concentrating the mill starch fraction and then subjecting it to multiple separation stages employing mechanical centrifugal separators such as those commercially available under the trademark "Merco" and commonly referred to as "Merco centrifugers." This approach was not entirely satisfactory as these centrifugal separators are relatively large, involve a high capital expenditure, require significant maintenance down time and operational adjustment, have a relatively high energy demand and operate most economically upon materials which have higher densities and, consequently, higher dry substance levels than those normally obtained from the mill starch stream.

Merco centrifugal separators were also used in combination with hydrocyclones, such as those commercially available under the tradename "DorrClone". The use of hydrocyclones for this and other purposes is known. For example, U.S. Pat. No. 2,689,810 discloses the use of hydrocyclones to enhance starch/gluten separation and describes a typical hydrocyclone; U.S. Pat. Nos. 3,029,168 and 3,072,501 disclose the use of hydrocyclones in a root starch isolation process; and, U.S. Pat. No. 2,642,185 discloses the use of hydrocyclones to separate starch particles of different sizes. Although the combination of centrifugal separators and hydrocyclones represented an improvement over the use of only centrifugal separators, it was still a capital intensive and relatively costly operation.

It was believed that these problems could be overcome by utilizing a system containing only hydrocyclones. Such a system was put into operation from which there was obtained the protein-rich product on a 63-64% protein, insoluble dry solids basis (IDSB); whereas the minimum commercially acceptable protein level in the protein-rich product is generally recognized to be 67% IDSB. Consequently, the 63-64% IDSB protein product had to be further processed to obtain a commercially acceptable product. Substantially the same results were obtained in connection with the starch-rich product which contained about 0.45% insoluble protein IDSB whereas the generally acceptable level is less than about 0.38% insoluble protein IDSB. To obtain commercially acceptable starch-rich and protein-rich products, therefore, both of these products had to be subjected to further treatment making the system economically unattractive.

Thus, these prior art approaches utilizing only hydrocyclones have made it possible to obtain separation of either a starch-rich fraction or a gluten-rich fraction, but it has not been possible to obtain concurrent separation of both fractions that meet commercially acceptable levels. In particular, U.S. Pat. No. 2,689,810 (mentioned above) discloses an all hydrocyclone system and indicates that this system can be used to concurrently separate both a starch-rich fraction and a gluten-rich fraction. Supposedly, both fractions would be at commercially acceptable levels. However, close scrutiny of this patent reveals that there is no teaching of how many separation stages are to be employed, how many hydrocyclones are to be used in the separation stages, whether the hydrocyclones used can be of different size or must be the same size, whether it is the actual pressures used in the system or the pressure differentials or both that are important, and whether the concentration of the gluten(protein)-rich fraction is important.

According to the disclosure of U.S. Pat. No. 2,689,810, a system utilizing only hydrocyclones was employed to obtain a starch containing 0.28-0.32% protein (Col. 7) and a gluten fraction containing 60%-70% protein (Col. 8). Attempts to concurrently obtain these products based upon Example D of this patent were not successful. Example D of U.S. Pat. No. 2,689,810 indicates a gluten stream having a concentration of 15-20 grams/liter (2.0-2.6 ounces/gallon) of insoluble dry substance. However, it was found that gluten concentration, as well as the pressures used in the system, are critical if commercially acceptable starch and protein products are to be concurrently obtained.

Thus, while it is possible to obtain either a commercially acceptable starch or protein product by using the system and conditions suggested in U.S. Pat. No. 2,689,810, it has not been possible to obtain both products concurrently at commercially acceptable levels. Unless this can be achieved, such a system would be economically unattractive.

THE INVENTION

It has now been found that a starch-rich product and a protein-rich product of commercially acceptable quality can be economically and concurrently obtained by using the system of this invention. In general, this system comprises two separation zones, each of which employs only hydrocyclones arranged in a series of separation stages within each zone. The mill starch stream from a corn wet milling operation is supplied to a first separation zone and is successively fed, under pressure, through at least two separation stages to obtain a protein-rich product from the last of said stages. At the first separation stage in the first separation zone, a starch-enriched stream is separated. This starch-enriched stream is fed, under pressure, successively through a plurality of starch washing stages comprising the second separation zone. From the last starch washing stage, there is recovered a starch-rich product.

Obtaining the protein-rich and starch-rich products from the system of the invention requires close control of the operating conditions within the system as well as the mill starch stream initially supplied to it.

Generally, the mill starch fraction from a typical corn wet milling process contains about 6-8% protein on an insoluble solids basis and is generally at a temperature of about 100°-125° F. Similarly, the density of the mill starch stream containing insoluble starch and insoluble protein ranges from about 7.5° to about 8.5° Be (60° F.). Accordingly, counter current wash water rates should be about 22-32 gals./100 lbs. corn on a dry substance basis at a mill starch stream density of about 7.5° Be (60°

F.) and about 27–32 gals./100 lbs. corn on a dry substance basis at a mill starch stream density of about 8.5° Be (60° F.). While these levels are acceptable, a mill starch stream density of about 8.0°±0.2° Be (60° F.) is preferred at counter current wash water rates of about 25–32 gals./100 lbs. corn on a dry substance basis, preferably about 25–27 gals./100 lbs. of corn on a dry substance basis.

The pH of the mill starch stream is also important. The isoelectric pH of the mill starch stream is typically about 4.5, but it has been found that when the pH is adjusted to either side of this point, improved separation results are obtained. Therefore, the mill starch stream pH should be adjusted to be between about 3.0–6.0.

It is important to control the temperature to which the streams are subjected as they are passed through the system. Generally, a temperature of at least about 90° F. should be used to obtain acceptable product quality. Naturally, this temperature should not exceed the gelatinization temperature of the starch material and should therefore be maintained below about 145° F. Preferably, the temperature within the system is maintained at about 110°–135° F.

Control of the pressure within the system is also important, especially across the separation stages in each of the two separation zones. This is more fully developed hereinafter in connection with the description of the operation of the system.

When these operating conditions are properly controlled, there is obtained from the system of the invention a protein-rich product consisting of at least about 68% DSB protein and a starch-rich product containing no more than about 0.38% insoluble protein IDSB. When preferred operating conditions were used, a protein-rich product having about 74% protein IDSB and a starch-rich product containing no more than about 0.3% insoluble protein IDSB have been obtained. These product specifications are well above minimum acceptable commercial quality levels and the system of the invention results in lower capital and operational costs.

THE DRAWING

The system of the invention will become more clear from the ensuing description when considered together with the accompanying drawing wherein the several figures illustrate preferred embodiments of the invention and wherein:

FIG. 1 is a diagramatic flow chart showing the major processing steps used in a typical corn wet milling operation;

FIG. 2 is an exploded vertical view in section of the hydrocyclone used in the system of the invention;

FIG. 3 is a schematic plan view of a housing containing a plurality of the hydrocyclones of FIG. 2; and, FIG. 4 is a schematic flow chart illustrating the operating stages of the system of the invention.

DETAILED DESCRIPTION OF THE INVENTION

Figure 4:
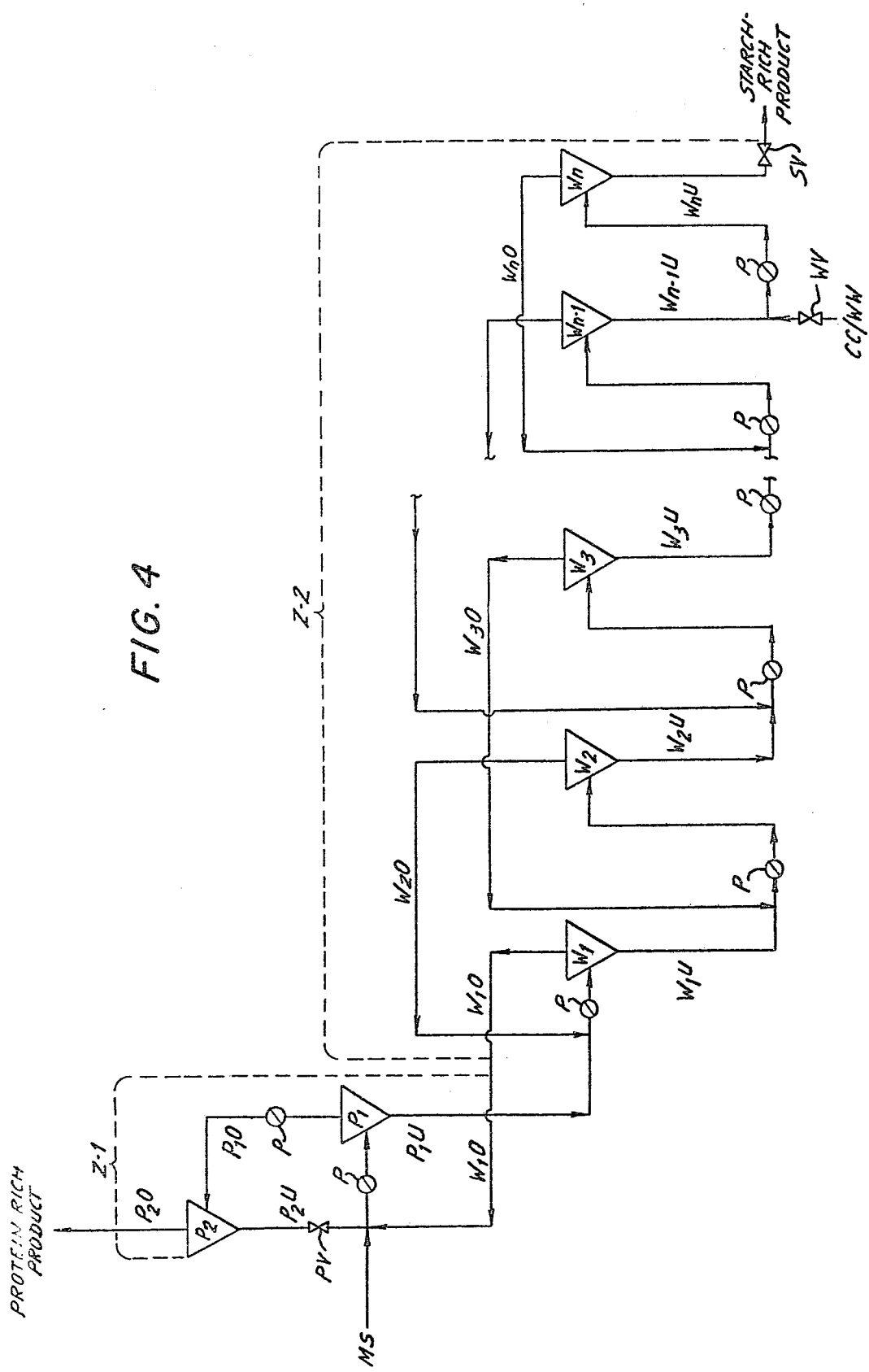

As can be seen in FIG. 1, corn is typically subjected to a series of successive operations to separate and recover various fractions. After the fiber separation operation, there is obtained a "mill starch stream" that contains both a starch fraction and a gluten, or protein, fraction. It is to the separation of these starch and protein fractions from the mill starch stream that the system of the invention is directed.

As mentioned earlier, only hydrocyclones are utilized in the system of the invention. While several types of hydrocyclones are commercially available, those sold under the trade name "DorrClone" are preferred. A DorrClone hydrocyclone that can be used in the system of the invention is illustrated in FIG. 2 and comprises three basic members: a vortex member 10, a conical member 11, and an apex member 12.

Vortex member 10 contains a tapered vortex finder 13 formed therein in the general shape of an inverted cone having a wide-mouthed upper opening 14 and a constricted lower opening at its apex 15.

Conical member 11 has formed therein a cylindrical upper section 16, an inverted, conical-shaped central section 17 and a cylindrical lower section 18. Each of these sections; i.e., 16, 17, and 18, are in common axial alignment, with the lower end of central conical section 17 terminating in a constricted opening whose apex 17a extends into cylindrical lower section 18. Intermediate the ends of cyclindrical section 16 there is provided a tangential feed inlet port 19 formed in the wall of conical member 11.

Apex member 12 contains a central bore 20 formed therein which is open at each end as indicated at 21 and 22.

Threaded portions are formed in each of the members 10, 11 and 12 as indicated by reference numerals 23, 24, 25 and 26 which provide the means by which these members are secured to each other in assembly. When assembled, tapered vortex finder 13, cylindrical upper section 16, conical section 17, cylindrical lower section 18 and central bore 20 are in common axial alignment thereby forming a continuous communicating passage therebetween with constricted opening 15 of tapered vortex finder 13 positioned adjacent inlet port 19.

As used in the operation of the system of the invention, the hydrocyclone shown in FIG. 2 is continuously supplied with the mill starch stream (FIG. 1) carrying the insoluble starch and protein fractions that are to be separated. The stream is tangentially fed under pressure into the hydrocyclone through inlet port 19 whereupon the stream is immediately subjected to rapid rotation upon contacting cylindrical section 16.

This rapid and immediate rotation results in developing centrifugal forces that quickly become significantly greater than the force of gravity. Consequently, those particles carried in the mill starch stream that have a slow settling rate; i.e., the protein, enter constricted opening 15 and travel through vortex finder 13 before they are subsequently discharged through wide upper opening 14 of vortex member 10. This discharge of slow settling particles is termed "overflow." Concurrently, those particles having a relatively fast settling rate; i.e., the starch, migrate through conical section 17 as a result of the continued centrifugal forces acting on them and are subsequently discharged through open end 22 of apex member 12. This discharge of the fast settling particles is termed "underflow." Thus, separation of these insoluble, particulate materials is effected solely by the hydraulic forces created in the hydrocyclones and does not involve any moving parts.

As stated earlier, successful operation of the system of the invention depends upon proper control of certain parameters; namely, the pH and density of the mill starch supply stream, the counter current wash water rates and the temperature and pressure used within the system. It was also found that another factor pertaining to the hydrocyclones used is important; i.e., the inside diameter of the cylindrical section 16 in conical member 11 identified by "d" in FIG. 2. Under the controlled operating conditions of pH, density, temperature, pressure and counter current wash water rates used in the system of the invention, this dimension "d" is about 10 millimeters. With the inside diameter "d" of these hydrocyclones at about 10 mm, the included angle of conical section 17, identified by "a" in FIG. 2, is typically about 5°–7.5°. As used throughout the application and in the claims, therefor, reference to "hydrocyclones" should be understood to mean a hydrocyclone as shown in FIG. 2 and described immediately above. However, it should be understood that hydrocyclones having different diameters "d" in cylindrical section 16 and/or different conical angles "a" in conical section 17 can also be used provided the operating conditions of the system are adjusted accordingly.

Since individual hydrocyclones have a limited, relatively low flow-through capacity, a plurality of hydrocyclones are used and are arranged in parallel in each of the several stages comprising the system of the invention. Conveniently, these groups of hydrocyclones are assembled in parallel in a housing as schematically illustrated in FIG. 3.

In FIG. 3, reference numeral 30 indicates a housing which has, at one end thereof, a supply manifold 31 through which the mill starch stream (FIG. 1) is supplied to a plurality of hydrocyclones 32, it being understood that the mill starch stream is concurrently fed to each hydrocyclone through its inlet port 19 (FIG. 2). The overflow discharged through the wide opening 14 of the vortex member 10 (FIG. 2) of each hydrocyclone 32 is delivered to an overflow manifold 33 and is then carried from the housing 30 through an overflow outlet 34. Similarly, the underflow discharged through the bottom opening 22 of the apex member 12 (FIG. 2) of each hydrocyclone 32 is delivered to an underflow manifold 35 and is subsequently carried from the housing 30 through an underflow outlet 36. It will be readily apparent to those skilled in the art that the flow-through rate of the mill starch stream through housing 30 can be varied, all other factors being held constant, by increasing or decreasing the number of hydrocyclone units in each housing. A typical manifold for hydrocyclones is disclosed in U.S. Pat. No. 2,550,341.

The system of the invention is schematically shown in FIG. 4 wherein it can be seen that the system comprises basically two separation zones, Z-1 and Z-2, and a counter current flow of wash water introduced adjacent the discharge end of Z-2 as indicated by "CC/WW." The separation stages in each separation zone comprise a plurality of housings containing the hydrocyclones described hereinabove.

The first separation zone, Z-1, is the primary separation zone from which the protein-rich product is obtained and contains the two separation stages, $P_1$ and $P_2$. The mill starch stream ("MS") is delivered under pressure to the first separation stage $P_1$. The overflow discharge stream $P_1O$ from first separation stage $P_1$ is circulated to the second separation stage $P_2$ and the underflow discharge stream $P_2U$ from second separation stage $P_2$ is combined with the incoming mill starch stream, MS, for recirculation through first separation stage $P_1$. The protein-rich product is obtained from the overflow discharge stream $P_2O$ of second separation stage $P_2$. Underflow discharge stream $P_1U$ is a starch-enriched stream which is supplied to the stages in the second separation zone Z-2.

Second separation zone, Z-2, comprises a plurality of additional separation stages which are referred to as "starch washing stages" and are identified as $W_1$, $W_2$, $W_3$, ... $W_n$, "n" denoting the last such starch washing stage. Thus, the starch-enriched underflow discharge stream $P_1U$ is supplied under pressure to a first starch washing stage $W_1$. The underflow discharge stream $W_1U$ from the first starch washing stage $W_1$ is then supplied under pressure to the second starch washing stage $W_2$ whose underflow discharge stream $W_2U$ is, in turn, supplied under pressure to a third starch washing stage $W_3$. Accordingly, the underflow discharge stream from each starch washing stage is supplied under pressure to the next, successive starch washing stage until the starch-rich product is obtained from the underflow discharge stream $W_nU$ of the last starch washing stage $W_n$.

Delivery of the underflow discharge stream under pressure from each starch washing stage to a next, successive starch washing stage is readily accomplished by placing suitable pump means, identified by "p" in the feed stream between adjacent starch washing stages. Suitable pump means "p" are also used to supply the incoming mill starch stream MS to separation stage $P_1$ and deliver the overflow discharge stream $P_1O$ to separation stage $P_2$.

As seen from the schematic of FIG. 4, the counter current wash water, CC/WW, is preferably introduced into the system in the underflow discharge stream $W_{n-1}U$ of the penultimate starch washing stage $W_{n-1}$.

The overflow discharge stream from each starch washing stage is recirculated back into the starch washing operation at an upstream starch washing stage and is combined with the underflow discharge stream being fed to that stage. Preferably, the overflow discharge stream from a starch washing stage is recirculated back to and combined with the feed stream to the next, preceding, upstream starch washing stage as shown in FIG. 4. For example, the overflow discharge stream $W_3O$ from starch washing stage $W_3$ is recirculated back to starch washing stage $W_2$ and combined with underflow discharge stream $W_1U$ being fed to starch washing stage $W_2$. Similarly, overflow discharge stream $W_2O$ is recirculated back to starch washing stage $W_1$. In this instance, however, overflow discharge stream $W_2O$ is combined with the underflow discharge stream $P_1U$ being fed to starch washing stage $W_1$ from first separation stage $P_1$. Finally, overflow discharge stream $W_2O$ is recirculated to be combined with underflow discharge stream $P_2U$ and the mill starch stream being supplied to the first separation stage $P_1$ from the second separation stage $P_2$. In this manner, continuous starch enrichment of the starch enriched stream is achieved until the starch-rich product is obtained. A typical arrangement for a hydrocyclone countercurrent washing system is disclosed in U.S. Pat. No. 2,840,524.

While any number of starch washing stages can be used, it was found that at least nine such stages are needed to obtain the starch-rich product desired. Although more than nine starch washing stages can be used such as up to about 15 or more, it was found that such additional starch washing stages did not significantly improve the economics of the system. Thus, "$W_n$" in the schematic of FIG. 4 would be "$W_9$" in the preferred embodiment of the invention.

It will be recalled that to obtain protein-rich and starch-rich products that meet their respective product specifications, proper control of the pH and density of the mill starch stream as well as control of the temperatures, pressures and counter current wash water rates used within the system are necessary. To reiterate, the pH of the mill starch supply stream should be about 3.0–6.0; the density of the mill starch supply stream at 60° F. should be about 7.5°–8.5° Be, preferably 8.0°±0.2° Be, the counter current wash water rate should be about 22–32 gals./100 lbs. corn on a dry substance basis, preferably about 25–27 gals./100 lbs. corn on a dry substance basis and the temperature within the system should be no less than about 90° F., but less than the gelatinization temperature of the starch fraction of the material being treated; i.e., less than about 145° F. Preferably, the temperature within the system should be about 110°–135° F. with the temperature of the mill starch supply stream at about 100°–125° F.

The pressure within the system is considered from two aspects: that to be used in the first separation zone Z-1 at first and second separation stages $P_1$ and $P_2$; and, that to be used in the second separation zone Z-2 at starch washing stages $W_1$–$W_n$ (FIG. 4). In this regard, it is not only the actual pressures imparted by pumps "p" to transport the streams through the system that are considered, but the pressure differentials across each of the separation stages in each of the separation zones that are important. The pressure differential is determined from the difference of the pressure at which material is fed to each stage and the pressure at which the overflow is discharged from that stage. Accordingly, the pressure differential across first separation stage $P_1$ and second separation stage $P_2$, hereinafter referred to as $\Delta P$, should be no less than about 100 p.s.i., preferably about 120–180 p.s.i. Similarly, the pressure differential across each successive starch washing stage, hereinafter referred to as $\Delta PW$, should be no less than about 80 p.s.i., preferably 100–150 p.s.i.

For example, if the supply stream is delivered to first separation stage $P_1$ at a pressure of 145 p.s.i., then the pressure at which the overflow stream $P_1O$ is discharged can be about 10 p.s.i. to result in a $\Delta P$ across $P_1$ of 135 p.s.i. which falls within the preferred range. In the same manner, if the pressure at which the supply stream is delivered to starch washing stage $W_3$ is 120 p.s.i., then overflow stream $W_3O$ can be discharged at a pressure of 20 p.s.i. to result in a preferred $\Delta PW$ across $W_3$ of 100 p.s.i.

All supply streams, overflow streams and underflow streams contain a mixture of materials commonly referred to as "middlings" which comprise individual and combined particles of starch, protein and fiber. These middlings exhibit an intermediate settling rate; i.e., a faster settling rate than the slower settling protein particles and a slower settling rate than the faster settling starch particles. Continuous fractionation; i.e., separation, of the starch and protein particles contained in the middlings is of primary importance to the successful operation of the system. If the middlings are not continuously and adequately fractionated, they tend to build up in the system and interfere with obtaining acceptable protein-rich and starch-rich products. Continuous and adequate fractionation of the middlings in the system of the invention is accomplished by proper control of the operating conditions, especially the pressure differentials, $\Delta P$ and $\Delta PW$, across each of the separation stages in the system.

Generally, the higher the pressures used to effect higher pressure differentials across each of the separation stages, the better will be the separation performance of the system. As is well known to those skilled in the art, however, the amount of pressure used in the system will depend upon the economics of the hardware used in the system. Consequently, the pressures and pressure differentials set forth above are based upon reasonable economic performance of the system consistent with end product objectives.

As can be seen from FIG. 4, the system includes control valves identified as "PV" across underflow discharge stream $P_2U$, "WV" across the incoming counter current wash water CC/WW, and "SV" across underflow discharge stream from the last starch washing stage $W_n$. Adjustment of these valves affects the pressures throughout the system so that product qualities within acceptable levels can be constantly obtained. Thus, proper adjustment of these valves, singly and/or concurrently, serves to "fine tune" the operation of the system. Generally, these valves are adjusted so that the protein-rich stream $P_2O$ contains no more than about 1.6 and no less than about 1.35 ounces per gallon (oz./gal.) insoluble dry substance (IDS) materials; i.e., insoluble protein, starch and fiber, and preferably about 1.5 oz./gal. IDS materials.

It will be recalled that U.S. Pat. No. 2,689,810 discloses a gluten stream having a concentration of 15–20 grams/liter (2.0–2.6 oz./gal.) of insoluble dry substance. Based upon the teachings of this patent, attempts were made to concurrently obtain a commercially acceptable starch-rich product and protein-rich product. These attempts were not successful, even when the conditions of the system of the present invention were used. Using starch and gluten quality as standards, the results obtained using the system of the present invention were as shown in Table A below:

TABLE A

| GLUTEN QUALITY V. STARCH QUALITY AT GLUTEN CONCENTRATIONS | | |
|---|---|---|
| Insoluble Protein in Gluten IDSB (%) | Insoluble Protein in Starch IDSB (%) | Gluten Concentration IDS (oz./gal.) |
| 80 | 0.53 | 1.11 |
| 75 | 0.41 | 1.32 |
| *70 | 0.32 | 1.50 |
| 65 | 0.28 | 1.65 |
| 60 | 0.29 | 1.77 |

*Commercially acceptable combination.

As can be seen from Table A, acceptable results were obtained only when the protein-rich stream ($P_2O$) contained a concentration of about 1.5 oz./gal. IDS materials. This is significantly lower than the concentration of 15–20 grams/liter (2.0–2.6 oz./gal.) insoluble dry substance disclosed in U.S. Pat. No. 2,689,810 and its unacceptability to concurrently obtain commercial protein and starch products is reflected in the values shown in Table A above.

EXAMPLES

The system of the invention is further illustrated by the following examples which are not intended to be, nor should they be construed as being, limitative thereof. The examples will be better understood when considered together with the drawing, particularly FIG. 4 thereof.

EXAMPLE 1

In this example, two primary stages ($P_1$ and $P_2$) and nine starch washing stages ($W_1-W_9$) were used. a pressure drop ($\Delta P$) of 145 p.s.i. was used across the $P_2$ stage and a pressure drop ($\Delta P$) of 114 p.s.i. was used across the $P_1$ stage. The starch washing stages averaged a pressure drop ($\Delta PW$) of about 90 p.s.i. across each stage. Other conditions were as follows:

| | |
|---|---|
| Mill Starch pH | 4.5 |
| Mill Starch Density | 7.8° Be at 60° F. |
| Mill Starch Temperature | 109° F. |
| Mill Starch Feed Rate | 7.48 gal./min. |
| Mill Starch Insoluble Protein | 7.09% IDSB |
| Washwater (CC/WW) Rate | 3.1 gal./min. |
| Washwater (CC/WW) Temperature | 98° F. |
| Insoluble Materials in Protein-Rich Stream ($P_2O$) | 1.39 oz./gal. IDS materials |
| Flow Rate of Starch-Enriched Product ($W_9U$) | 1.85 gal./min. |

The processing conditions of the system are set forth in Table I below wherein the hydrocyclones employed had an inside diameter (d) of 10 mm and a conical angle (a) of 5°52'.

TABLE I

| Stage | No. of Hydrocyclones | No. of Housings | Pressure Drop p.s.i. | |
|---|---|---|---|---|
| $P_2$ | 9 | 1 | 145.0 | } $\Delta P$ |
| $P_1$ | 13 | 1 | 114.0 | |
| $W_1$ | 8 | 2 (4 in ea. housing) | 86.5 | |
| $W_2$ | 6 | 2 | 99.0 | |
| $W_3$ | 6 | 2 | 89.0 | |
| $W_4$ | 6 | 2 | 92.0 | } $\Delta PW$ |
| $W_5$ | 6 | 2 | 85.0 | |
| $W_6$ | 6 | 2 | 88.0 | |
| $W_7$ | 6 | 2 | 95.0 | |
| $W_8$ | 6 | 2 | 95.0 | |
| $W_9$ | 5 | 2 (3 in one & 2 in other housing) | 88.0 | |

Under the operating conditions set forth above, there was obtained a protein-rich product containing 72.1% insoluble protein IDSB and a starch-rich product containing 0.26% insoluble protein IDSB.

EXAMPLE 2

In this example, three primary stages ($P_1$, $P_2$ and $P_3$) and nine starch washing stages ($W_1-W_9$) were used. Pressure drops in the primary stages ($\Delta P$) were 120–125 p.s.i. and averaged 90 p.s.i. in the starch washing stages ($\Delta PW$). Other conditions were as follows:

| | |
|---|---|
| Mill Starch pH | * |
| Mill Starch Density | 8.3° Be at 60° F. |
| Mill Starch Temperature | * |
| Mill Starch Feed Rate | 6.60 gal./min. |
| Mill Starch Insoluble Protein | 6.61% IDSB |
| Washwater (CC/WW) Rate | 3.1 gal./min. |
| Washwater (CC/WW) Temperature | 100° F. |
| Insoluble Materials in Protein-Rich Stream ($P_3O$) | 1.46 oz./gal. IDS materials |
| Flow Rate of Starch-Enriched Product ($W_9U$) | 1.9 gal./min. |

*not measured

The hydrocyclones employed were the same as in Example 1 above. The processing conditions of the system are set forth in Table II below.

TABLE II

| Stage | No. of Hydrocyclones | No. of Housings | Pressure Drop p.s.i. | |
|---|---|---|---|---|
| $P_3$ | 8 | 2 | 120.0 | |
| $P_2$ | 11 | 1 | 125.0 | } $\Delta P$ |
| $P_1$ | 13 | 1 | 125.0 | |
| $W_1$ | 8 | 2 | 85.5 | |
| $W_2$ | 6 | 2 | 103.0 | |
| $W_3$ | 6 | 2 | 90.0 | |
| $W_4$ | 6 | 2 | 90.5 | |
| $W_5$ | 6 | 2 | 84.5 | } $\Delta PW$ |
| $W_6$ | 6 | 2 | 86.5 | |
| $W_7$ | 6 | 2 | 94.5 | |
| $W_8$ | 6 | 2 | 90.0 | |
| $W_9$ | 5 | 2 | 89.0 | |

Under the foregoing conditions, there was obtained a protein-rich product containing 70.8% insoluble protein IDSB and a starch-rich product containing 0.33% insoluble protein IDSB. It will be noted that this system had three primary stages rather than two and, while acceptable results were obtained, the results were similar to the system in Example 1 using only two primary stages.

EXAMPLE 3

This system employed two primary stages ($P_1$ and $P_2$) and ten starch washing stages ($W_1-W_{10}$). Other conditions were as follows:

| | |
|---|---|
| Mill Starch pH | * |
| Mill Starch Density | 8.0° Be at 60° F. |
| Mill Starch Temperature | 115° F. |
| Mill Starch Feed Rate | * |
| Mill Starch Insoluble Protein | 6.4% IDSB |
| Washwater (CC/WW) Rate | 3.1 gal./min. |
| Washwater (CC/WW) Temperature | 104° F. |
| Insoluble Materials in Protein-Rich Stream ($P_3O$) | 1.47 oz./gal. IDS materials |
| Flow Rate of Starch-Enriched Product ($W_{10}U$) | 1.95 gal./min. |

*not measured

The hydrocyclones used were the same as in Example 1 above and the processing conditions are shown in Table III below.

TABLE III

| Stage | No. of Hydrocyclones | No. of Housings | Pressure Drop p.s.i. | |
|---|---|---|---|---|
| $P_2$ | 10 | 1 | 130.0 | } $\Delta P$ |
| $P_1$ | 14 | 1 | 124.0 | |
| $W_1$ | 8 | 2 | 121.0 | |
| $W_2$ | 7 | 2 | 97.0 | |
| $W_3$ | 6 | 2 | 95.0 | |
| $W_4$ | 6 | 2 | 87.0 | |
| $W_5$ | 6 | 2 | 91.0 | } $\Delta PW$ |
| $W_6$ | 6 | 2 | 86.0 | |
| $W_7$ | 6 | 2 | 80.0 | |
| $W_8$ | 6 | 2 | 89.5 | |
| $W_9$ | 6 | 2 | 87.0 | |

TABLE III-continued

| Stage | No. of Hydrocyclones | No. of Housings | Pressure Drop p.s.i. |
|---|---|---|---|
| $W_{10}$ | 5 | 2 | 89.0 |

From this system there was obtained a protein-rich product containing 70.0% insoluble protein IDSB and a starch-rich product containing 0.33% insoluble protein IDSB.

This example demonstrates that using an additional starch washing stage resulted in good performance and product quality under proper operating conditions, though not necessarily improved results. For obvious economic reasons, using more than two primary stages, and more than nine starch washing stages should be avoided unless the mill starch composition and/or separability is such that the additional stages are needed to obtain commercially acceptable starch and gluten products.

EXAMPLE 4

For this example, two primary stages ($P_1$ and $P_2$) and nine starch washing stages ($W_1$-$W_9$) were used. The pressure drop ($\Delta P$) across $P_2$ and $P_1$ was reduced to 87 and 81 p.s.i., respectively. Other conditions were as follows:

| | |
|---|---|
| Mill Starch pH | 4.5 |
| Mill Starch Density | 7.8° Be At 60° F. |
| Mill Starch Temperature | 107° F. |
| Mill Starch Feed Rate | 6.64 gal./min. |
| Mill Starch Insoluble Protein | 7.0% IDSB |
| Washwater (CC/WW) Rate | 3.1 gal./min. |
| Washwater (CC/WW) Temperature | 86° F. |
| Insoluble Materials in Protein-Rich Stream ($P_2O$) | 1.5 oz./gal. IDS materials |
| Flow Rate of Starch-Enriched Product ($W_9U$) | 1.95 gal./min. |

The same hydrocyclones were used as in Example 1 and the processing conditions were as shown in Table IV below:

TABLE IV

| Stage | No. of Hydrocyclones | No. of Housings | Pressure Drop p.s.i. | |
|---|---|---|---|---|
| $P_2$ | 11 | 1 | 87.0 | } $\Delta P$ |
| $P_1$ | 15 | 1 | 81.0 | |
| $W_1$ | 8 | 2 | 86.5 | |
| $W_2$ | 6 | 2 | 97.0 | |
| $W_3$ | 6 | 2 | 88.0 | |
| $W_4$ | 6 | 2 | 91.0 | |
| $W_5$ | 6 | 2 | 86.0 | } $\Delta PW$ |
| $W_6$ | 6 | 2 | 87.5 | |
| $W_7$ | 6 | 2 | 97.0 | |
| $W_8$ | 6 | 2 | 88.0 | |
| $W_9$ | 5 | 2 | 93.0 | |

From this system there was obtained a protein-rich product containing 68.8% insoluble protein IDSB and a starch-rich product containing 0.47% insoluble protein IDSB. Bearing in mind that commercially acceptable products are those wherein the protein-rich product contains at least about 68% IDSB protein and the starch-rich product contains no more than about 0.38% IDSB insoluble protein, it can be seen that this system resulted in obtaining a protein-rich product that was just barely acceptable (68.8% IDSB protein) and a starch-rich product that did not meet the minimum commercially acceptable level (0.47% insoluble protein IDSB). It should also be noted while the protein concentration in the protein-rich stream was within the 1.35 to 1.6 oz./gal. range, the starch-protein separation was not acceptable due to the low pressure drops across $P_1$ and $P_2$. The starch quality could probably have been improved by decreasing $W_9U$ and $P_2U$ flow rates, but this would have resulted in obtaining a protein product below the acceptable protein level before an acceptable starch product was obtained. This is illustrated in the following example.

EXAMPLE 5

Two primary stages ($P_1$ and $P_2$) and nine starch washing stages ($W_1$-$W_9$) were used with low pressure drops ($\Delta P$) across the primary stages as in Example 4 above. Other operating conditions were as follows:

| | |
|---|---|
| Mill Starch pH | 4.1 |
| Mill Starch Density | 7.5° Be at 60° F. |
| Mill Starch Temperature | 100° F. |
| Mill Starch Feed Rate | 7.86 gal./min. |
| Mill Starch Insoluble Protein | 7.6% IDSB |
| Washwater (CC/WW) Rate | 3.1 gal./min. |
| Washwater (CC/WW) Temperature | 96° F. |
| Insoluble Materials in Protein-Rich Stream ($P_2O$) | 1.96 oz./gal. IDS materials |
| Flow Rate of Starch-Enriched Product ($W_9U$) | 1.80 gal./min. |

The same hydrocyclones were employed as in Example 1 and the other processing conditions were as set forth in Table V below:

TABLE V

| Stage | No. of Hydrocyclones | No. of Housings | Pressure Drop p.s.i. | |
|---|---|---|---|---|
| $P_2$ | 11 | 1 | 85.5 | } $\Delta P$ |
| $P_1$ | 15 | 1 | 79.0 | |
| $W_1$ | 8 | 2 | 82.0 | |
| $W_2$ | 6 | 2 | 96.6 | |
| $W_3$ | 6 | 2 | 89.5 | |
| $W_4$ | 6 | 2 | 91.0 | |
| $W_5$ | 6 | 2 | 87.0 | } $\Delta PW$ |
| $W_6$ | 6 | 2 | 88.5 | |
| $W_7$ | 6 | 2 | 97.5 | |
| $W_8$ | 6 | 2 | 89.0 | |
| $W_9$ | 5 | 2 | 92.0 | |

The protein-rich product obtained contained 58.13% insoluble protein IDSB and the starch-rich product obtained contained 0.34% insoluble protein IDSB. As can be seen, these results were the opposite of those obtained in Example 4; that is, the starch quality was acceptable (0.34% insoluble protein IDSB), but the protein quality was too low (58.13% insoluble protein IDSB). The protein quality could have been improved by increasing the $W_9U$ and the $P_2U$ flow rates, but this would then have resulted in unacceptable starch quality although acceptable protein quality would have been obtained as in Example 4.

The foregoing examples illustrate the importance of utilizing proper pressures throughout the system and obtaining appropriate pressure drops ($\Delta P$ and $\Delta PW$) across the stages in each separation zone. When the mill starch stream fed to the system exhibits exceptionally good separability characteristics, acceptable starch and protein products can be obtained concurrently at lower pressures. However, mill starch that exhibits such good separability characteristics is not usually obtained in day-to-day variations in mill starch. Thus, higher pressure differentials in the separation zones of the system of the invention are required to consistently, economically and concurrently produce starch and protein products of acceptable commercial quality.

It will be apparent to those skilled in the art that the foregoing examples, especially Examples 1-3, are illustrative of the system of the invention at a relatively low product capacity and that the number of hydrocyclones used are related directly to the capacity of the system. Naturally, therefore, the scale of the system illustrated would have to be increased to realize higher quantities of commercially acceptable starch and protein production.

What is claimed:

1. A method for obtaining a protein-rich product and a starch-rich product from the mill starch fraction of a corn wet milling process, said method comprising:

adjusting said mill starch fraction to a pH of about 3.0-6.0 and a density at 60° F. of about 7.5°-8.5° Be;

feeding said mill starch fraction through a first separation zone containing at least two protein separation stages and a second separation zone containing a plurality of starch washing stages, each stage of said protein separation stages and each stage of said starch washing stages comprising a plurality of hydrocyclones arranged in parallel within a housing, said hydrocyclones comprising a vortex member, a conical member and an apex member, said mill starch fraction being fed under pressure successively through said protein separation stages such that said mill starch fraction is separated into a protein-rich stream and a starch enriched stream, said protein-rich stream being discharged through the vortex members of said hydrocyclones in said protein separation stages and said starch-enriched stream being discharged through the apex members of said hydrocyclones in said protein separation stages;

concurrently feeding a counter current stream of wash water through said first and second separation zones, said wash water being introduced adjacent the penultimate stage of said starch washing stages at a rate of about 22-32 gals./100 lbs. corn on a dry substance basis;

maintaining the pressure differential $\Delta P$ across each of said protein separation stages at at least about 100 p.s.i.;

removing a protein-rich stream from the last stage of said protein separation stages;

recombining the starch-enriched stream discharged from the apex member of the second of said protein separation stages with the initial feed of said mill starch fraction;

feeding the starch enriched stream discharged from the apex member of the first of said protein separation stages under pressure successively through said plurality of starch washing stages such that lighter, slower settling materials are discharged through the vortex members of said hydrocyclones in said starch washing stages and the heavier, faster settling materials are discharged through the apex members of said hydrocyclones in said starch washing stages, said faster settling materials consisting essentially of an increasingly enriched starch stream;

recombining the lighter, slower settling materials discharged from said second separation zone with the initial feed of said mill starch fraction;

maintaining the pressure differential $\Delta PW$ across each successive starch washing stage at at least about 80 p.s.i.;

maintaining the temperature in said first and second separation zones at a level no lower than about 90° F. and no higher than about 145° F.;

recirculating said lighter, slower settling materials discharged from one of said starch washing stages to an upstream starch washing stage such that said lighter, slower settling materials are combined thereat with said starch enriched stream being fed to said upstream starch washing stage; removing the enriched starch stream from the last stage of said starch washing stages; and adjusting the pressure in said first and second separation zones such that the protein-rich stream obtained from said last protein separation stage contains no more than about 1.6 and no less than about 1.35 oz./gal. insoluble dry substance materials.

2. The method of claim 1 wherein said lighter settling materials discharged in said starch washing stages are recirculated from a starch washing stage to a next, preceding upstream starch washing stage.

3. The method of claim 1 wherein about 9-15 of said starch washing stages are contained in said second separation zone.

4. The method of claim 1 wherein said $\Delta P$ is about 120-180 p.s.i.

5. The method of claim 1 wherein said $\Delta PW$ is about 100-150 p.s.i.

6. The method of claim 1 wherein said temperature is maintained at about 110°-135° F.

7. The method of claim 1 wherein the pressure in said first and second separation zones is adjusted such that said protein-rich product obtained contains about 1.5 oz./gal. insoluble dry substance materials.

8. The method of claim 1 wherein said protein-rich product has a protein content of at least about 68% IDSB and said starch-rich product contains no more than about 0.38% IDSB insoluble protein.

9. The method of claim 1 wherein the protein content in said protein-rich product is at least about 74% IDSB and the insoluble protein in said starch-rich product is no greater than about 0.3% IDSB.

10. The method of claim 1 wherein the density of said mill starch fraction is adjusted to about 8.0°±0.2° Be.

11. The method of claim 10 wherein the rate of counter current wash water is about 25-32 gals./100 lbs. corn on a dry substance basis.

12. A method for obtaining a protein-rich product and a starch-rich product from the mill starch fraction of a corn wet milling process, said method comprising:

adjusting said mill starch fraction to a pH of about 3.0-6.0 and a density at 60° F. of about 8.0°±0.2° Be;

feeding said mill starch fraction through a first separation zone containing two protein separation stages and a second separation zone containing about 9-15 starch washing stages, each stage of said protein separation stages and each stage of said starch washing stages comprising a plurality of hydrocyclones arranged in parallel within a housing, said hydrocyclones comprising a vortex member, a conical member and an apex member, said mill starch fraction being fed under pressure successively through said protein separation stages such that said mill starch fraction is separated into a protein-rich stream and a starch enriched stream, said protein-rich stream being discharged through the vortex members of said hydrocyclones in said protein separation stages and said starch-enriched stream being discharged through the apex members of said hydrocyclones in said protein separation stages;

concurrently feeding a counter current stream of wash water through said first and second separation zones, said wash water being introduced adjacent the penultimate stage of said starch washing stages at a rate of about 25–32 gals./100 lbs. corn on a dry substance basis;

maintaining the pressure differential $\Delta P$ across each of said protein separation stages at about 120–180 p.s.i.; removing a protein-rich stream from the last stage of said protein separation stages, said protein-rich stream having a protein content of at least about 68% IDSB;

recombining the heavier, faster settling materials discharged from the last of said protein separation stages with the initial feed of said mill starch fraction;

feeding the starch enriched stream discharged from the apex member of the first of said protein separation stages under pressure successively through said starch washing stages such that lighter, slower settling materials are discharged through the vortex members of said hydrocyclones in said starch washing stages and the heavier, faster settling materials are discharged through the apex members of said hydrocyclones in said starch washing stages, said faster settling materials consisting essentially of an increasingly enriched starch stream;

recombining the lighter, slower settling materials discharged from said second separation zone with the initial feed of said mill starch fraction;

maintaining the pressure differential $\Delta PW$ across each successive starch washing stage at about 100–150 p.s.i.;

maintaining the temperature in said first and second separation zones at about 110°–135° F.;

recirculating said lighter, slower settling materials discharged from one of said starch washing stages to a next, preceding upstream starch washing stage such that said lighter, slower settling materials are combined thereat with said starch enriched stream being fed to said upstream starch washing stage;

removing the enriched starch stream from the last stage of said starch washing stages, said enriched starch stream containing no more than about 0.38% IDSB insoluble protein; and adjusting the pressure in said first and second separation zones such that the protein-rich stream obtained from said last protein separation stage contains no more than about 1.6 and no less than about 1.35 oz./gal. insoluble dry substance materials.

13. The method of claim 12 wherein nine of said starch washing stages are contained in said second separation zone.

14. The method of claim 12 wherein the protein content in said protein-rich product is at least about 74% IDSB and the insoluble protein in said starch-rich product is no greater than about 0.3% IDSB.

15. The method of claim 12 wherein the pressure in said first and second separation zones is adjusted such that said protein-rich product obtained contains about 1.5 oz./gal. insoluble dry substance materials.

* * * * *

UNITED STATES PATENT AND TRADEMARK OFFICE
CERTIFICATE OF CORRECTION

PATENT NO. : 4,244,748
DATED : January 13, 1981
INVENTOR(S) : Vincent P. Chwalek and C. W. Schwartz It is certified that error appears in the above-identified patent and that said Letters Patent are hereby corrected as shown below:

Column 6, line 49, "$W_2O$" should read --$W_1O$--.

Column 10, line 45, "$(P_3O)$" should read --$(P_2O)$--.

Column 10, Table III, line 67, "80.0" should read --86.0--.

Signed and Sealed this

Twenty-eighth Day of July 1981

[SEAL]

Attest:

Attesting Officer

GERALD J. MOSSINGHOFF
Commissioner of Patents and Trademarks